(12) United States Patent
Ke et al.

(10) Patent No.: US 10,632,694 B2
(45) Date of Patent: Apr. 28, 2020

(54) CREEL STRUCTURE INTEGRATED ON THE FIBER PLACEMENT HEAD OF AUTOMATED FIBER PLACEMENT EQUIPMENT

(71) Applicant: ZHEJIANG UNIVERSITY, Zhejiang (CN)

(72) Inventors: Yinglin Ke, Zhejiang (CN); Junxia Jiang, Zhejiang (CN); Zhenzheng Ke, Zhejiang (CN); Jiangxiong Li, Zhejiang (CN); Weidong Zhu, Zhejiang (CN); Weiwei Qu, Zhejiang (CN); Liang Cheng, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 36 days.

(21) Appl. No.: 16/197,370

(22) Filed: Nov. 21, 2018

(65) Prior Publication Data
US 2019/0375170 A1 Dec. 12, 2019

(30) Foreign Application Priority Data
Jun. 11, 2018 (CN) .......................... 2018 1 0594248

(51) Int. Cl.
| | |
|---|---|
| B29C 70/38 | (2006.01) |
| B65H 49/32 | (2006.01) |
| B65H 59/06 | (2006.01) |
| B65H 75/44 | (2006.01) |

(52) U.S. Cl.
CPC ......... *B29C 70/384* (2013.01); *B65H 49/322* (2013.01); *B65H 59/06* (2013.01); *B65H 75/4463* (2013.01); *B65H 2402/441* (2013.01); *B65H 2601/25* (2013.01); *B65H 2701/53* (2013.01)

(58) Field of Classification Search
None
See application file for complete search history.

(56) References Cited

U.S. PATENT DOCUMENTS

| | | | | |
|---|---|---|---|---|
| 10,112,348 | B2 * | 10/2018 | Oldani | B29C 70/32 |
| 2007/0044896 | A1 * | 3/2007 | Tingley | B65H 69/00 |
| | | | | 156/157 |
| 2007/0044897 | A1 * | 3/2007 | Hoffmann | B29C 53/8016 |
| | | | | 156/157 |
| 2009/0095410 | A1 * | 4/2009 | Oldani | B29C 70/382 |
| | | | | 156/189 |
| 2010/0200168 | A1 * | 8/2010 | Oldani | B29C 70/382 |
| | | | | 156/441 |

(Continued)

*Primary Examiner* — Jeffry H Aftergut
(74) *Attorney, Agent, or Firm* — JCIPRNET

(57) ABSTRACT

This invention relates to a creel structure integrated on the fiber placement head of the automated placement equipment, comprising: fiber placement head mounting base, fixed yarn box component fixed and mounted on fiber placement head mounting base, and revolving yarn box component mounted on fiber placement head mounting base, the said revolving yarn box component is coupled with the fiber placement head mounting base through revolving shaft. This creel structure can avoid intervention that arise due to equipment maintenance and spindle replacement, making equipment maintenance and spindle replacement more convenient and swift.

9 Claims, 6 Drawing Sheets

(56) References Cited

U.S. PATENT DOCUMENTS

| | | | |
|---|---|---|---|
| 2012/0241093 A1* | 9/2012 | Borgmann | B29C 70/384 |
| | | | 156/350 |
| 2013/0056575 A1* | 3/2013 | Grimshaw | B29C 31/00 |
| | | | 242/559 |
| 2014/0202640 A1* | 7/2014 | Vaniglia | B29C 70/38 |
| | | | 156/538 |

* cited by examiner

218# CREEL STRUCTURE INTEGRATED ON THE FIBER PLACEMENT HEAD OF AUTOMATED FIBER PLACEMENT EQUIPMENT

CROSS-REFERENCE TO RELATED APPLICATION

This application claims the priority benefit of China patent application serial no. 201810594248.3, filed on Jun. 11, 2018. The entirety of the above-mentioned patent application is hereby incorporated by reference herein and made a part of the specification.

BACKGROUND OF THE INVENTION

Technical Field

This invention belongs to the technical field of automated composite material placement, specifically relates to a creel structure integrated on the fiber placement head of automated fiber placement equipment.

Related Art

Composite material has advantages of light weight, high strength, high modulus, fatigue resistant, anti-corrosion and high designability, and has been widely applied in the aviation field etc. However, composite material member is primarily dependent on manual manufacture, which is labor intensive and low in efficiency, and the quality of the member is not guaranteed.

According to statistics, in 2013, global composite material consumption reached 8.2 million tons, of which the direct market value reaches 110 billion US dollars. Composite material is indispensable to the rapid development of aviation etc., and advanced placement equipment is the key to realizing composite material application. The emergence of advanced placement equipment marks the end of the era of semi-manual placement which is low in efficiency, high cost and high waste materials. Therefore, advanced composite material manufacture equipment and technology are also the focus for development.

Automated fiber placement technology is an automatic composite material processing technology applicable for large curvature complex member. Back in 1989, the US company Cincinnati had designed the first automated placement machine. After over twenty years of development, automated fiber placement technology has become relatively mature and complete, and Computer Numerically Controlled (CNC) fiber placement equipment has been commercialized.

Currently, major automated fiber placement equipment manufacturers include: Ingersoll, Electroimpact, Forest-Line, Coriolis and M-Torres. In terms of layout, fiber placement machines manufactured by these manufacturers can be divided into two types: one type is that the yarn box is independently arranged at a place far away from the fiber placement head and does not move along with the fiber placement head, another type is that the creel is directly mounted on the fiber placement head.

For the standalone yarn box layout, the yarn box is much far away from the fiber placement head, during conveying process, fiber breakage etc. can easily happen, besides, long tow conveying path results in easy contamination of tows.

For the layout in which the creel is directly mounted on the fiber placement head, the above-mentioned shortcomings can be avoided, and it is the current development trend for fiber placement head structure design.

SUMMARY OF THE INVENTION

In consideration of the shortcomings of the prior art, this invention is to provide a creel structure integrated on the fiber placement head of automated placement equipment, which avoids intervention that arise due to equipment maintenance and spindle replacement, making equipment maintenance and spindle replacement more convenient and swift.

The technical solution provided by this invention is as follows:

A creel structure integrated on the fiber placement head of automated fiber placement equipment, comprising:

Fiber placement head mounting base;

Fixed yarn box component fixed on the mounting base of the fiber placement head;

And a revolving yarn box component arranged on the mounting base of the fiber placement head, the said revolving yarn box component is coupled with the mounting base of the fiber placement head through revolving shaft.

In the above-mentioned technical solution, attributable to the fact that the revolving yarn box component can revolve relatively to the mounting base of the fiber placement head, when working personnel conduct equipment maintenance or spindle replacement, they have more operation room.

A fixed mounting face for mounting fixed yarn box component and a revolving mounting face for mounting revolving yarn box component are respectively provided at the side end of the said mounting base of the fiber placement head of this invention; the said fixed mounting face and the revolving mounting face are alternately arranged at the side end of the mounting base of the fiber placement head.=The number of the yarn box components can be added or expanded based on the specific requirement of the equipment, making the maximum number of tows of placement to 4N, where N is the number of the yarn box components.

A pair of upper yokes are arranged on the said revolving mounting face of this invention, the said revolving shaft is arranged between the upper yokes; a damping support rod is provided between the said upper yokes and the revolving yarn box component. The damping support rod is primarily to provide acting force for the revolving yarn box component, or to control the movement of the revolving yarn box component in combination with other acting forces.

A pair of lower yokes are arranged on the said revolving mounting face of this invention, a snap-joint mechanism is formed between the said lower yokes and the revolving yarn box component. The snap-joint mechanism is to realize the relative fixing of the revolving yarn box component and the mounting base of the fiber placement head, the snap joint mechanism can adopt the structure of that in the prior art, which can open when it is exerted with force.

Two symmetric fixed mounting faces and two symmetric revolving mounting faces are provided at the side end of the said mounting base of the fiber placement head of this invention, fixed yarn box components are respectively mounted on the two fixed mounting faces, and revolving yarn box components are respectively mounted on the two revolving mounting faces.

Preferably, the whole shape of the said fiber placement head mounting base is a square column, of which the sides are respectively for mounting fixed yarn box component and revolving yarn box component.

A handle is provided on the said revolving yarn box component of this invention.

The said fixed yarn box component and revolving yarn box component of this invention respectively comprise: yarn box body and tow conveying unit mounted on the yarn box body.

The said tow conveying unit of this invention comprises: tow collecting-depositing mechanism, backing paper recycling mechanism, tension detection mechanism, tension regulating mechanism and laser rangefinder mechanism. The spindle is installed on the tow collecting-depositing mechanism, the backing paper of the tow is recycled by the backing paper recycling mechanism, the tow with backing paper removed goes through tension regulating mechanism and tension detection mechanism to be conveyed towards the fiber placement head. The tension regulating mechanism realizes stable constant tension output for the tow, avoiding tow breakage in the course of conveying. Laser rangefinder mechanism is to detect the thickness of the tow left on the tow collecting-depositing mechanism to alarm for spindle replacement in time.

Two tow conveying units are respectively arranged at the two sides of the said revolving yarn box body of this invention, and the two tow conveying units at the same side are in an upper-lower corresponding arrangement. Each yarn box component can independently complete the conveying of four routes of tows.

Comparing to the prior art, the benefits of this invention are as follows:

(1) In this invention, attributable to the fact that the revolving yarn box component can revolve relatively to the mounting base of the fiber placement head, when working personnel conduct equipment maintenance or spindle replacement, they have more operation room.

(2) In this invention, the number of the yarn box components can be added or expanded based on the specific requirement of the equipment, making the maximum number of tows of placement to 4N, where N is the number of the yarn box components.

Where, 1: Fiber placement head mounting base; 101: Fixed mounting face; 102: Revolving mounting face; 103: Upper yoke; 104: Lower yoke; 105: Revolving shaft; 106: Damping support rod; 107: Snap-joint mechanism; 107a: First through-hole; 107b: Second through-hole; 107c: Fastening pin; 2: Revolving yarn box component; 201: Revolving yarn box body; 202: Handle; 3: Fixed yarn box component; 301: Fixed yarn box body; 4: Tow conveying unit; 401: Tow-collecting-depositing mechanism; 402: backing paper recycling mechanism; 403: Tension regulating mecha-nism; 404: Laser rangefinder mechanism; 405: Tension detecting mechanism; 5: Fiber placement component.

DETAILED DESCRIPTION OF THE EMBODIMENTS

Below is further detailed description of this invention in combination with specific embodiments and figures.

Figure 1:
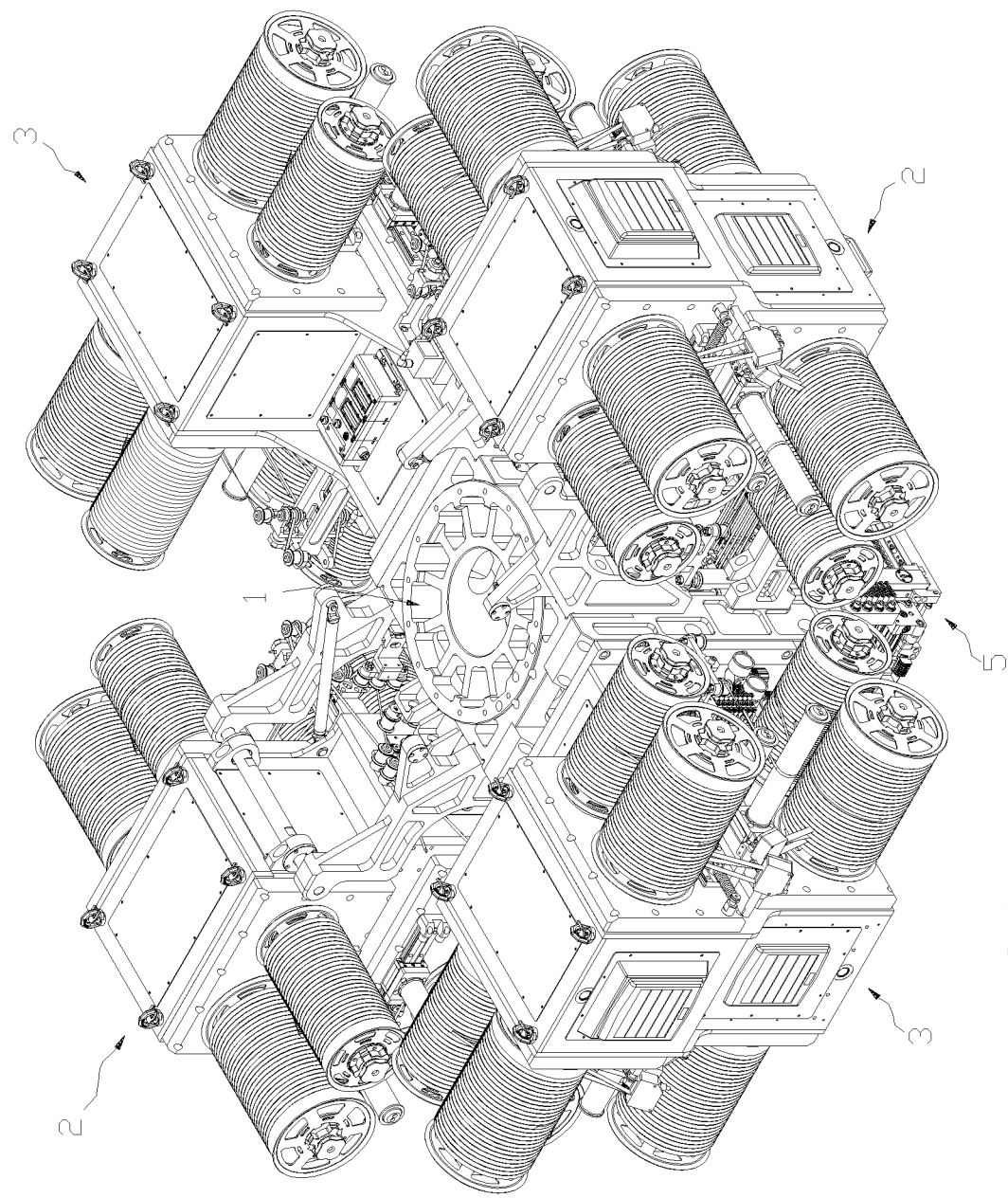
FIG. 1 is illustration of the structure of the fiber placement head of the placement equipment in the embodiment.

FIG. 1 is illustration of the structure of the fiber placement head of the composite material placement equipment. The creel structure of this invention is integrated on the fiber placement head of the automated placement equipment, the creel structure comprises: fiber placement head mounting base 1, fixed yarn box component 3 fixed and mounted on fiber placement head mounting base 1, and revolving yarn box component 2 mounted on fiber placement head mounting base 1.

Figure 2:
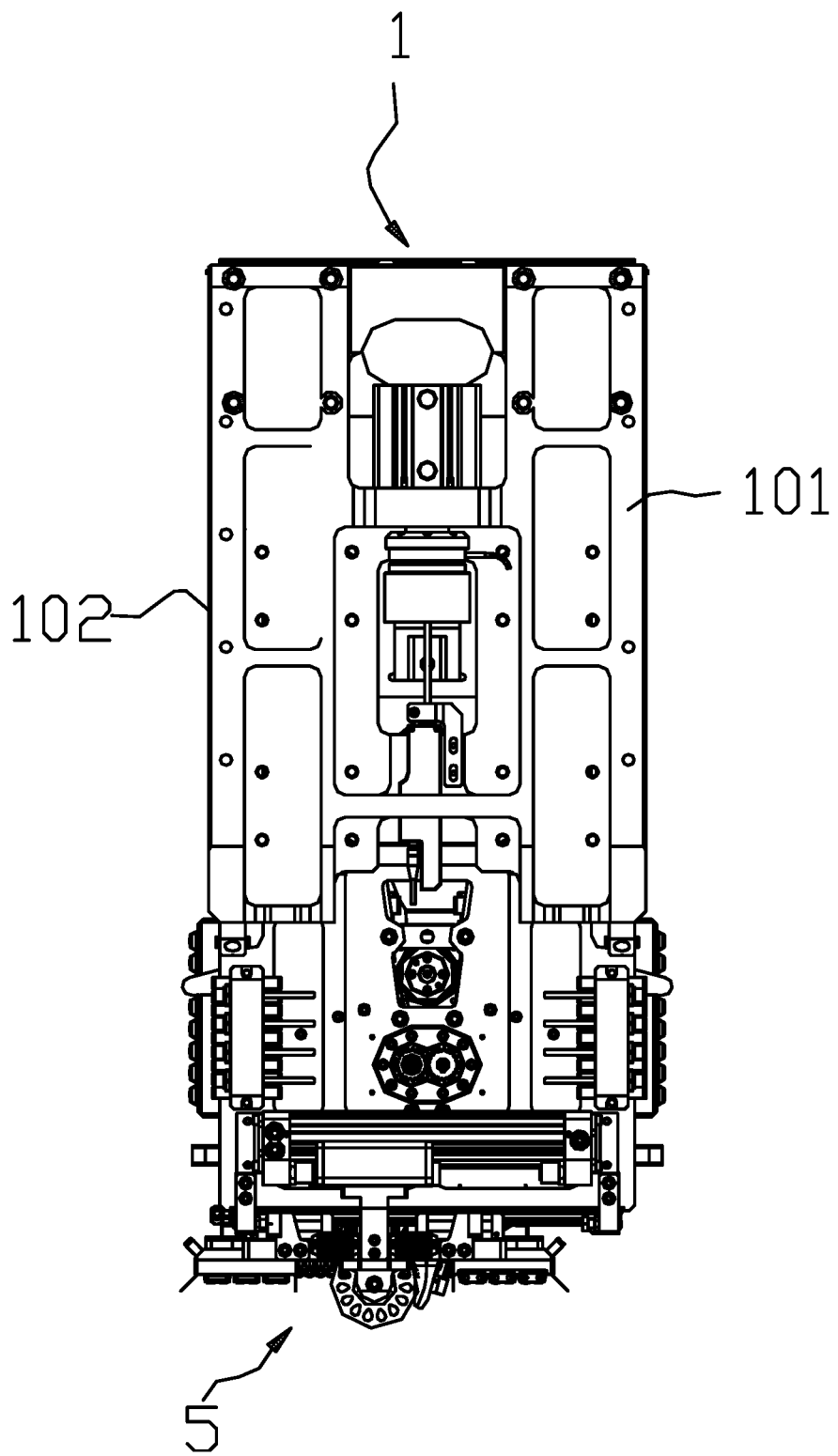
FIG. 2 is illustration of the structure of the mounting base of the fiber placement head in the embodiment.

As shown in FIG. 2, the whole shape of fiber placement head mounting base 1 is similar to a square column, the four sides of fiber placement head mounting base 1 are respectively two symmetric fixed mounting faces 101 and two revolving mounting faces 102. Fixed yarn box components 3 are respectively mounted on the two fixed mounting faces 101, revolving yarn box components 2 are respectively mounted on the two revolving mounting faces 102. Fiber placement component 5 is also mounted at the lower part of mounting base 1 for converging the tows conveyed on the creel structure, which are placed by the end press roll in fiber placement component 5.

Of course, the whole shape of fiber placement head mounting base 1 can also adopt regular hexagon column or regular octagon column, and fixed mounting face 101 and revolving mounting face 102 can also be alternately arranged on the sides of fiber placement head mounting base 1, in this way, the number of yarn box components can be added and expanded based on specific needs of the equipment, making the maximum number of tows to be placed as 4N, where N is the number of the yarn box components.

Figure 3:
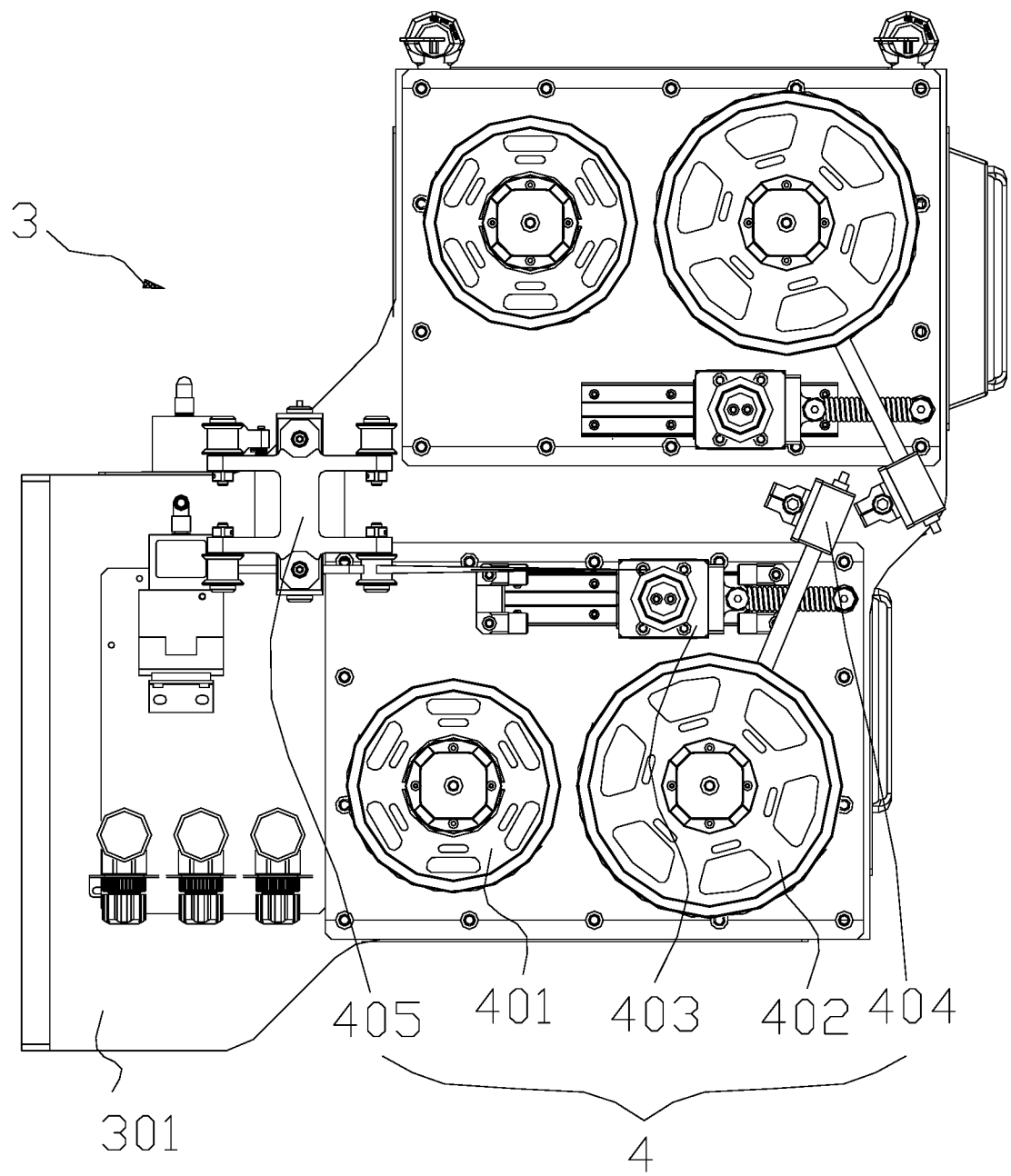
FIG. 3 is illustration of the structure of the fixed yarn box component in the embodiment.

As shown in FIG. 3, fixed yarn box component 3 comprises: fixed yarn box body 301 and tow conveying unit 4 installed on fixed yarn box body 301. Fixed yarn box body 301 is fixed and mounted on fixed mounting face 101 of fiber placement head mounting base 1, fixed yarn box body 301 can comprise upper and lower layers, two tow conveying units 4 are arranged at each of the two sides of fixed yarn box body 301, the two tow conveying units 4 at the same side are arranged in an upper-lower corresponding arrangement. Each yarn box component can independently complete the conveying of four routes of tows.

Wherein tow conveying unit 4 comprises: tow collecting-depositing mechanism 401, backing paper recycling mechanism 402, tension detection mechanism 405, tension regulating mechanism 403 and laser rangefinder mechanism 404. The spindle is installed on the tow collecting-depositing mechanism 401, the backing paper of the tow is recycled by the backing paper recycling mechanism 402, the tow with backing paper removed goes through tension regulating mechanism 403 and tension detection mechanism 405 to be conveyed towards fiber placement component 5. The tension regulating mechanism 403 realizes stable constant tension output for the tow, avoiding tow breakage in the course of conveying. Laser rangefinder mechanism 404 is used to detect the thickness of the tow left on the tow collecting-depositing mechanism 401 and provide a timely alarm for spindle replacement.

Figure 4:
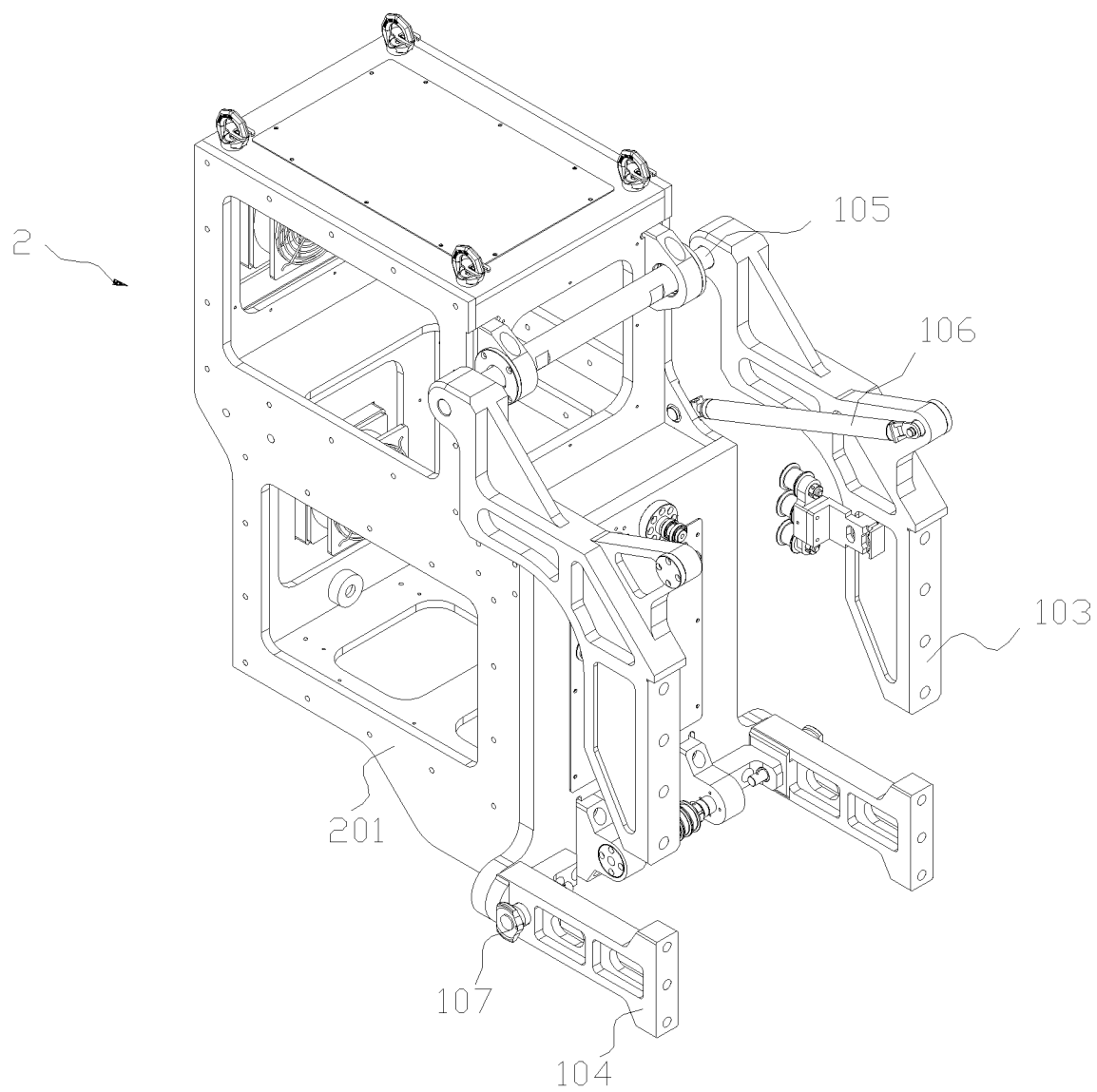
FIG. 4 is illustration of the local structure of the revolving yarn box component in the embodiment.
Figure 5:
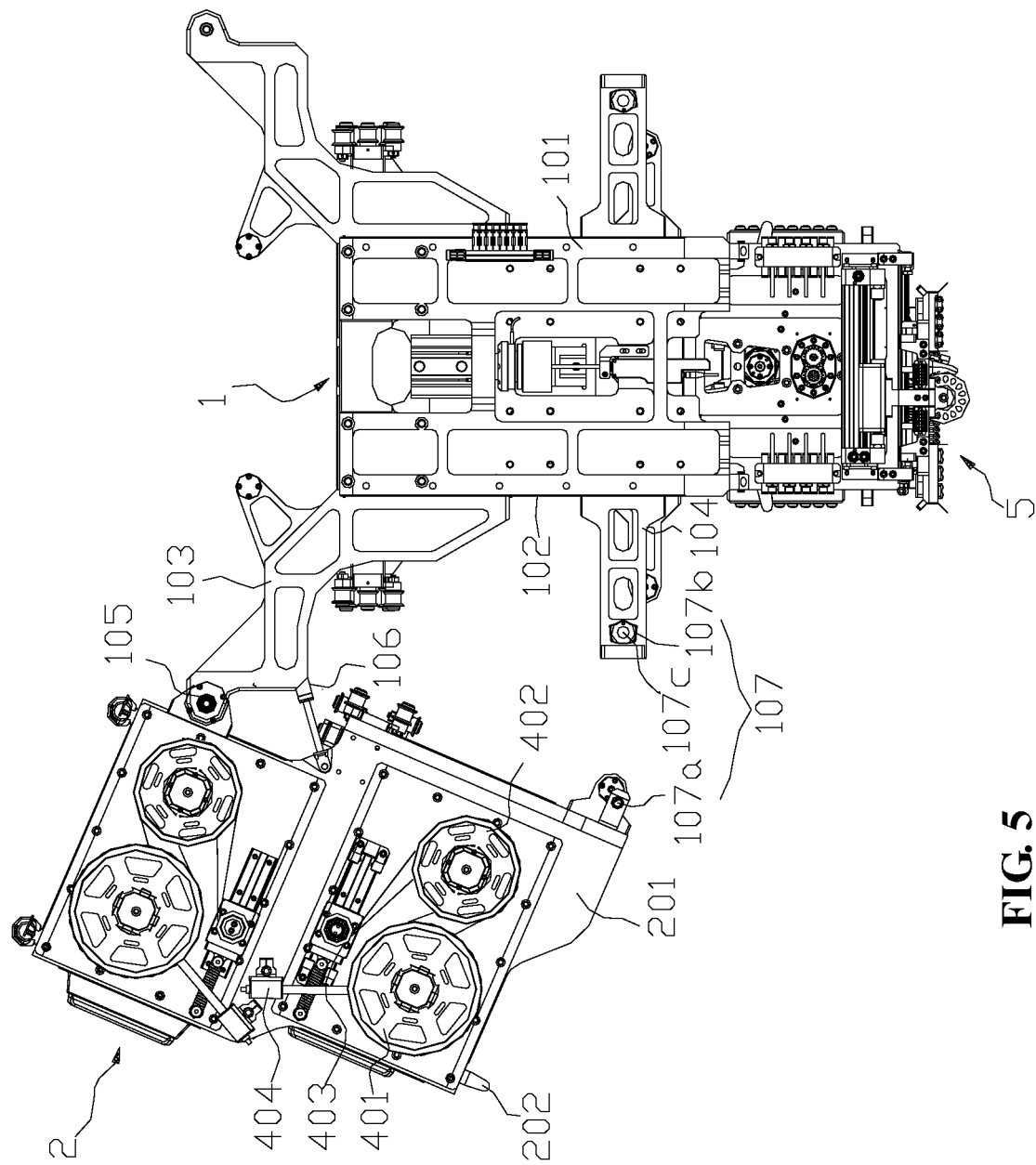
FIG. 5 is illustration of the local structure of the revolving state of the revolving yarn box component in the embodiment.
Figure 6:
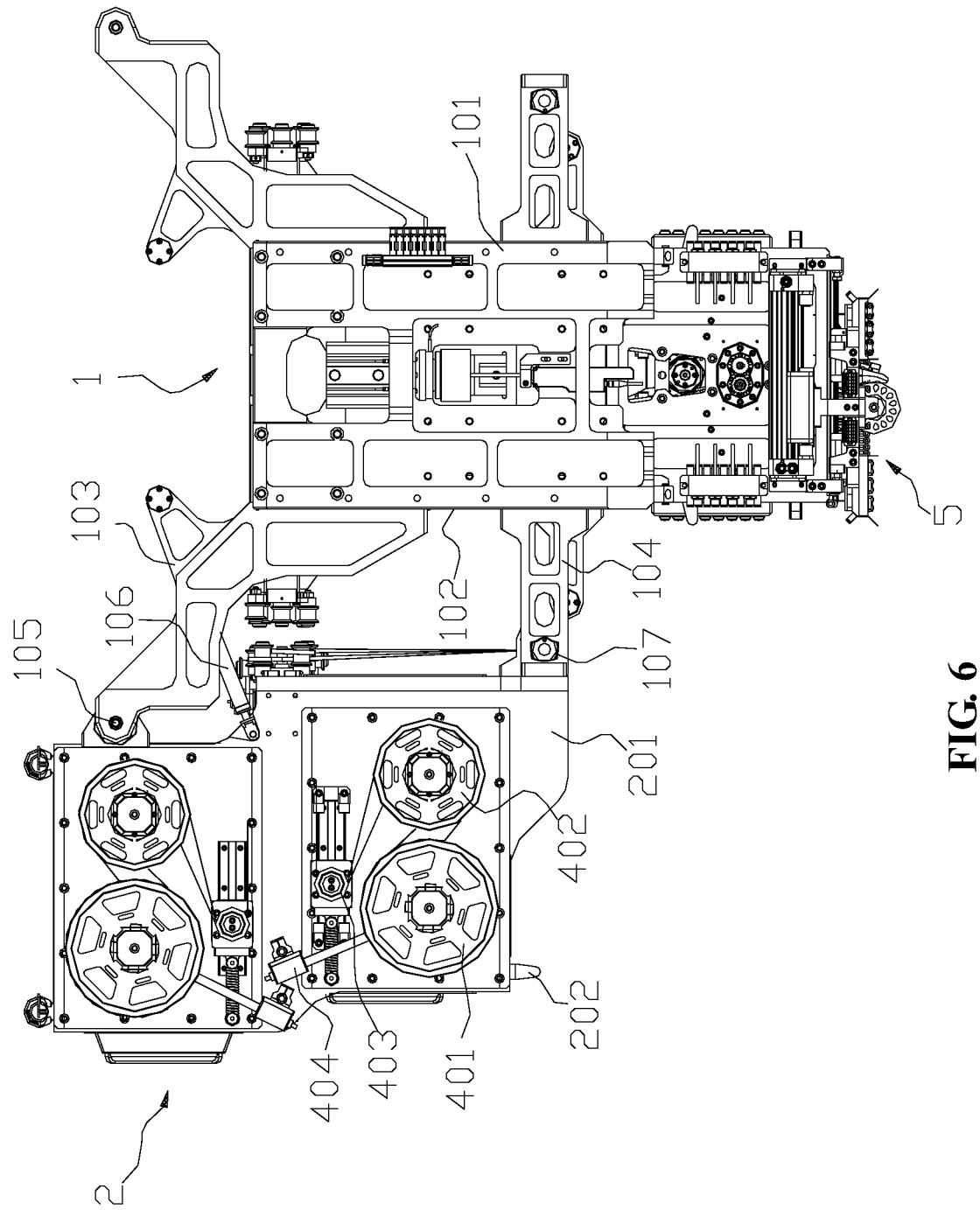
FIG. 6 is illustration of the local structure of the closed state of the revolving yarn box component in the embodiment.

As shown in FIG. 4-6, revolving yarn box component 2 comprises: revolving yarn box body 201, tow conveying unit 4 installed on revolving yarn box body 201 and handle 202. Revolving yarn box body 201 also comprises upper and lower layers, two tow conveying units 4 are also arranged at each of the two sides of the revolving yarn box body 201, and the two tow conveying units 4 at the same side are in an upper-lower corresponding arrangement. Each yarn box component can independently complete the conveying of four routes of tows. Since the structure and connection relationship of the tow conveying unit 4 on revolving yarn box body 201 are the same as those of the tow conveying unit 4 on fixed yarn box body 301, further description is not provided herein.

A pair of upper yokes 103 and a pair of lower yokes 104 are arranged on the revolving mounting face 102 of the fiber placement head mounting base 1. Upper yoke 103 is located at the upper end of the revolving mounting face 102, lower yoke 104 is located at the lower end of the revolving mounting face 102. Revolving shaft 105 is installed between the upper yokes 103, revolving yarn box body 201 is coupled with fiber placement head mounting base 1 through revolving shaft 105.

In addition, a pair of damping support rod 106 is further provided between upper yoke 103 and revolving yarn box body 201. The damping support rod 106 is primarily to provide acting force on the revolving yarn box body 201, or to control the movement of the revolving yarn box body 201 in combination with other acting forces, for example, by manually pulling the handle 202 at the lower part of the revolving yarn box body 201.

Snap joint mechanism 107 is formed between lower yoke 104 and the lower contact end of revolving yarn box body 201. Snap joint mechanism 107 comprises first through-hole 107a on revolving yarn box body 201, second through-hole 107b on lower yoke 104, and fastening pin 107c. Snap joint mechanism 107 is to realize the relative fixing of the revolving yarn box body 201 and the mounting base 1 of the fiber placement head, the snap joint mechanism 107 can adopt the structure of that in the prior art, which can open when it is exerted with force.

To facilitate tow traction at initial operation and avoid collision between spindles when replacing spindle and maintenance of equipment, the creel structure in this embodiment is designed. When conducting equipment maintenance and replacing spindle, revolving yarn box component 2 needs to be revolved to allow for more operation space and at the same time avoid intervening during spindle replacement.

Specific operation is as follows: as shown in FIGS. 5 and 6, open snap joint mechanism 107, pull the handle 202 on the revolving yarn box body 201, revolve revolving yarn box 201 along with the revolving shaft 105, damping support rod 106 ensures revolving yarn box body 201 to revolve stably. After equipment maintenance or spindle replacement operation is completed, push handle 202 on revolving yarn box body 201, damping support rod 106 makes revolving yarn box body 201 revolve around revolving shaft 105 stably and snap joint mechanism 107 is locked to allow the yarn box to resume normal working condition.

What is claimed is:

1. A creel structure integrated on the fiber placement head of automated fiber placement equipment, the creel structure comprising:
    fiber placement head mounting base;
    fixed yarn box component fixed on the fiber placement head mounting base; and
    a revolving yarn box component arranged on the fiber placement head mounting base, the revolving yarn box component is coupled with the fiber placement head mounting base through a revolving shaft.

2. A creel structure integrated on the fiber placement head of the automated fiber placement equipment according to claim 1, wherein a fixed mounting face for mounting the fixed yarn box component and a revolving mounting face for mounting the revolving yarn box component are respectively provided at the side ends of the fiber placement head mounting base; the fixed mounting face and the revolving mounting face are alternately arranged at the side ends of the fiber placement head mounting base.

3. A creel structure integrated on the fiber placement head of the automated fiber placement equipment according to claim 2, wherein a pair of upper yokes are arranged on the revolving mounting face, the revolving shaft is arranged between the upper yokes; a damping support rod is provided between the upper yokes and the revolving yarn box component.

4. A creel structure integrated on the fiber placement head of the automated fiber placement equipment according to claim 2, wherein a pair of lower yokes are arranged on the revolving mounting face, a snap joint mechanism is formed between the lower yokes and the revolving yarn box component.

5. A creel structure integrated on the fiber placement head of the automated fiber placement equipment according to claim 2, wherein two symmetrically placed fixed mounting faces and two symmetrically placed revolving mounting faces are provided at the side ends of the fiber placement head mounting base, the fixed yarn box component is mounted on each of the two fixed mounting faces, and the revolving yarn box component are mounted on each of the two revolving mounting faces.

6. A creel structure integrated on the fiber placement head of the automated fiber placement equipment according to claim 1, which is characterized in that: a handle is arranged on the revolving yarn box component.

7. A creel structure integrated on the fiber placement head of the automated fiber placement equipment according to claim 1, wherein the fixed yarn box component and the revolving yarn box component each comprises: a yarn box body and a tow conveying unit mounted on the yarn box body.

8. A creel structure integrated on the fiber placement head of the automated fiber placement equipment according to claim 7, wherein the tow conveying unit comprises: a tow collecting-depositing mechanism, a backing paper recycling mechanism, a tension detection mechanism, a tension regulating mechanism and a laser rangefinder mechanism.

9. A creel structure integrated on the fiber placement head of the automated fiber placement equipment according to claim 7, wherein two tow conveying units are arranged at each of the two sides of the revolving yarn box body, and the two tow conveying units at the same side of the revolving yarn box body are in an upper-lower corresponding arrangement.

* * * * *